(12) United States Patent
Hamlin et al.

(10) Patent No.: US 8,423,779 B2
(45) Date of Patent: Apr. 16, 2013

(54) COMPOUNDING SECURITY WITH A SECURITY DONGLE

(75) Inventors: Vernon W. Hamlin, Lisle, IL (US); Jorge L. Shimabukuro, Las Vegas, NV (US); Craig J. Sylla, Round Lake, IL (US); Anussom Veradej, Las Vegas, NV (US); Gerardus A. Weijers, Henderson, NV (US)

(73) Assignee: WMS Gaming, Inc., Waukegan, IL (US)

( * ) Notice: Subject to any disclaimer, the term of this patent is extended or adjusted under 35 U.S.C. 154(b) by 394 days.

(21) Appl. No.: 12/710,947

(22) Filed: Feb. 23, 2010

(65) Prior Publication Data

US 2010/0217992 A1 Aug. 26, 2010

Related U.S. Application Data

(60) Provisional application No. 61/154,546, filed on Feb. 23, 2009.

(51) Int. Cl.
*H04L 29/06* (2006.01)

(52) U.S. Cl.
USPC ............................. 713/176; 726/9; 713/185

(58) Field of Classification Search .................. None
See application file for complete search history.

(56) References Cited

U.S. PATENT DOCUMENTS

| 5,643,086 | A | * | 7/1997 | Alcorn et al. ................ 463/29 |
|---|---|---|---|---|
| 5,970,143 | A | | 10/1999 | Schneier et al. |
| 6,071,190 | A | | 6/2000 | Weiss et al. |
| 6,134,659 | A | | 10/2000 | Sprong et al. |
| 6,721,889 | B1 | | 4/2004 | Jaegtnes et al. |
| 6,892,302 | B2 | | 5/2005 | Wheeler et al. |
| 6,935,946 | B2 | | 8/2005 | Yoseloff et al. |
| 6,983,368 | B2 | | 1/2006 | Wheeler et al. |
| 7,818,578 | B2 | * | 10/2010 | Lewis et al. ................... 713/176 |
| 2003/0196096 | A1 | * | 10/2003 | Sutton ........................... 713/181 |
| 2003/0203755 | A1 | | 10/2003 | Jackson |
| 2006/0107058 | A1 | * | 5/2006 | Lewis et al. ................... 713/176 |
| 2006/0112275 | A1 | | 5/2006 | Jeal et al. |
| 2007/0241182 | A1 | | 10/2007 | Buer |
| 2007/0244824 | A1 | | 10/2007 | Motley et al. |
| 2009/0097657 | A1 | * | 4/2009 | Scheidt et al. ................ 380/277 |

FOREIGN PATENT DOCUMENTS

WO  WO 9524696 A2 * 9/1995

\* cited by examiner

*Primary Examiner* — Hadi Armouche
*Assistant Examiner* — Jaron K Brunner
(74) *Attorney, Agent, or Firm* — DeLizio Gilliam, PLLC

(57) ABSTRACT

Exposure of a security mechanism, over time and/or in particular markets, increases the likelihood that the security mechanism will be compromised. A security dongle, however, can resist/delay being comprised by compounding one or more security techniques with the security dongle security mechanism (e.g., a unique identifier of the dongle stored in a secure area of the dongle, a cryptographic token with a private key that cannot be retrieved from the memory of the security dongle, etc.). A dynamic element (e.g., a changing key) and/or an unexposed element (e.g., a private key secured by an owner) can be used in conjunction with a security dongle to buttress against being compromised. Using the dynamic element and/or the unexposed element, the security dongle can be cryptographically bound to at least an identifier of a piece of software enabled by the security dongle.

11 Claims, 8 Drawing Sheets

US 8,423,779 B2

COMPOUNDING SECURITY WITH A SECURITY DONGLE

RELATED APPLICATIONS

This application claims the priority benefit of U.S. Provisional Application Ser. No. 61/154,546 filed Feb. 23, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to securing various aspects of wagering game systems.

BACKGROUND

A security dongle is a piece of hardware to be used in physical connection with a computer as a security mechanism for a piece of software on the computer. The security dongle can be used for copy prevention and/or software feature enablement. Typically, the security dongle authenticates the piece of software based on a unique identifier of the security dongle. Without the security dongle, the piece of software will run in a restricted mode or not run at all.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Exposure of a security mechanism, over time and/or in particular markets, increases the likelihood that the security mechanism will be compromised. A security dongle, however, can resist/delay being comprised by compounding one or more security techniques with the security dongle security mechanism (e.g., a unique identifier of the dongle stored in a secure area of the dongle, a cryptographic token with a private key that cannot be retrieved from the memory of the security dongle, etc.). A dynamic element (e.g., a changing key) and/or an unexposed element (e.g., a private key secured by an owner) can be used in conjunction with a security dongle to buttress against being compromised. Using the dynamic element and/or the unexposed element, the security dongle can be cryptographically bound to at least an identifier of a piece of software enabled by the security dongle. The buttressed security dongle can be used to more effectively enforce copy protection, control feature enablement, etc.

Figure 1:
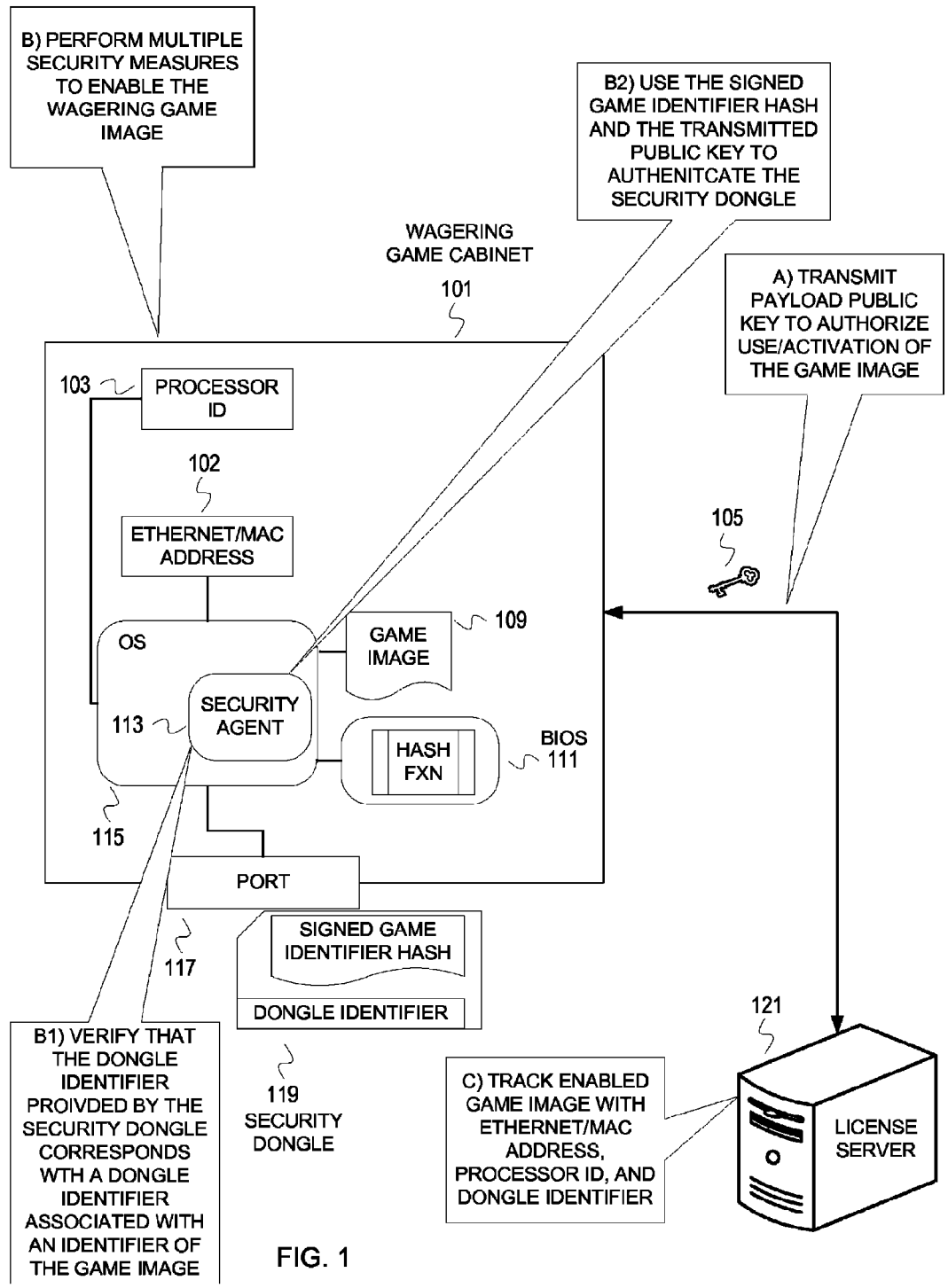
FIG. 1 depicts an example of activating software with a compound of a security dongle and an authentication mechanism.

FIG. 1 depicts an example of activating software with a compound of a security dongle and an authentication mechanism. A wagering game cabinet 101 comprises hardware 103 that indicates a processor identifier, hardware 102 that indicates an Ethernet/MAC address, and a port 117. The wagering game cabinet 101 hosts an operating system 115, a game image 109, a security agent 113, and a BIOS 111. The BIOS 111 comprises code that implements a hash function and code that implements a signature verification algorithm.

A security dongle 119 is coupled with the wagering game cabinet 101 via the port 117. The security dongle 119 comprises hardware that indicates an identifier of the security dongle 119 (e.g., a serial number, a digital key, etc.) and a digitally signed game image hash. Embodiments can use a game identifier or a hash of a game identifier in authorizing use/activation of a corresponding game image.

At a stage A, a license server 121 transmits a payload public key 105 to the wagering game cabinet 101. The payload public key 105 is generated for authentication of a payload, which, in this illustration, is the game image 109. In this illustration, the payload public key 105 is generated by the provider/developer of the wagering game cabinet 101. Before transmission, the developer or provider can sign the payload public key 105 with a secret signature key (e.g., a provider private key secured by the developer of the game image 109) that corresponds to a counterpart provider public key known to the BIOS 111. The security agent 113 or the BIOS 111 can then authenticate the transmitted provider public key 105. Embodiments may also embed the payload public key 105 in the game image 109, store the payload public key 105 in the security dongle 119 (e.g., in a secure memory area), etc.

At a stage B, the wagering game cabinet 101 performs multiple security measures to enable the game image 109. Stages B1 and B2 indicate the multiple security measures. At stage B1, the security agent 113 verifies that the dongle identifier provided by the security dongle 119 corresponds with a dongle identifier associated with an identifier of the game image 109. The security agent 113 obtains the dongle identifier from the security dongle 119, and compares it to a security dongle identifier associated with an identifier of the game image 109 in the wagering game cabinet 101. If the dongle identifiers do not match, then the game image 109 cannot be enabled. At stage B2, the security agent 113 uses the signed game identifier hash from the security dongle 119 and the transmitted payload public key 105 to authenticate the security dongle 119. The security agent 113 generates a hash of the identifier of the game image 109 with the hash function. The security agent 113 then verifies the signed game image identifier hash from the security dongle 119 using the hash of the identifier of the game image 109 in the wagering game cabinet 101, the transmitted payload public key 105, and the signature verification algorithm. If the signature is verified, then the security dongle 119, which has been associated with the identifier of the game image 109, carries signed data authenticated with the current payload public key 105. Embodiments may also use a provider public key associated with the wagering game cabinet 101 to authenticate the data carried by the security dongle 119. After the multiple security measures have been successfully performed, the security agent 113 enables the game image 109. If one of the two security measure fail, then the security agent 113 does not enable the game image 109. The security agent 113 can report any failures, for instance, to the license server 121. If the security agent 113 enables the game image 109, data is transmitted to the license server 121 to allow tracking of licenses/enabled game images.

At stage C, the license server 121 tracks enabled game images across multiple wagering game cabinets, including the wagering game cabinet 101. The license server 121 tracks enablement of the game image 109 with the processor identifier indicated by hardware 103, the Ethernet/MAC address indicated by the hardware 102, and the security dongle identifier associated with the identifier of the game image 109. Embodiments do not necessarily track enablement of software with this particular assortment of information. Embodiments can user less information (e.g., security dongle identifier and MAC address), or more information (e.g., a cabinet serial number and a game image serial number in addition to all of the example information).

Figure 2:
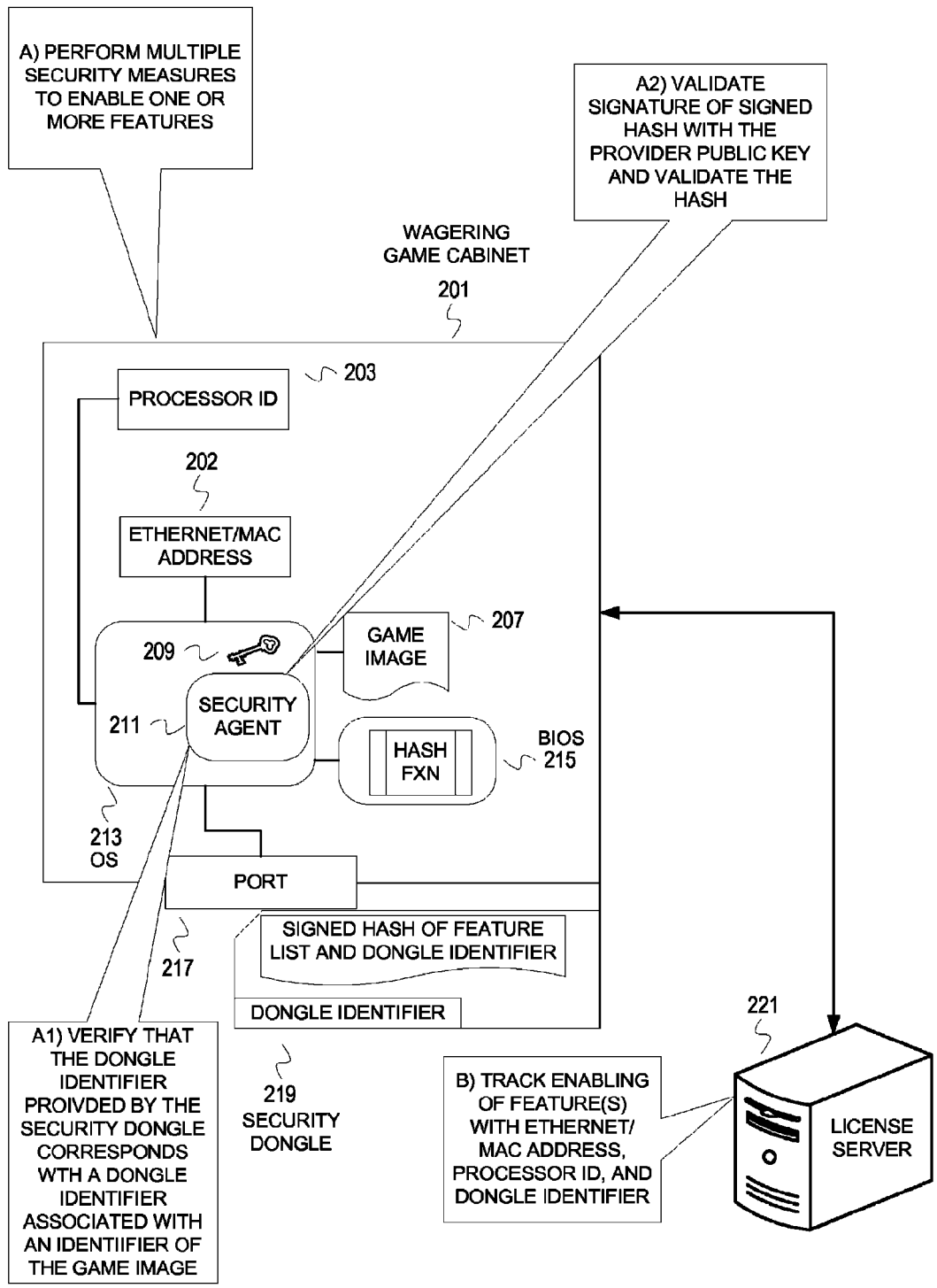
FIG. 2 depicts an example of enabling a software feature with a compound of a security dongle and an authentication mechanism.

Compounding security with a security dongle can also be used to enable certain features and control subsequent releases. FIG. 2 depicts an example of enabling a software feature with a compound of a security dongle and an authentication mechanism. A wagering game cabinet 201 comprises hardware 203 that indicates a processor identifier, hardware 202 that indicates an Ethernet/MAC address, and a port 217. The wagering game cabinet 201 hosts an operating system 213, a game image 207, a security agent 211, and a BIOS 215. The security agent 211 has access to a provider public key 209. The provider public key 209 corresponds to a developer or provider of the game image 207 and/or the wagering game cabinet 201. The BIOS 215 comprises code that implements a hash function and code that implements a digital signature validation algorithm.

A security dongle 219 is coupled with the wagering game cabinet 201 via the port 217. The security dongle 219 comprises hardware that indicates an identifier of the security dongle 219. In addition, the security dongle 219 carries a software feature list and a digitally signed hash of both the feature list and the security dongle identifier ("feature list dongle message hash"). The software feature list indicates features to be enabled and/or disabled. Further, embodiments may hash the feature list, the security dongle identifier, and an identifier of a corresponding game(s). Embodiments can also indicate a game identifier(s) in the software feature list. Embodiments can store the software feature list and the feature list dongle message hash in accordance with various techniques (e.g., embed the digitally signed feature list dongle message hash in the software feature list, append the digitally signed feature list dongle message hash to the software feature list, etc.).

At a stage A, the wagering game cabinet 210 performs multiple security measures to enable one or more features. Stages A1 and A2 depict the multiple security measure for this example. At stage A1, the security agent 211 verifies that the dongle identifier provided by the security dongle 219 corresponds with a dongle identifier associated with the game image 207. At a stage A2, the security agent 211 uses the provider public key 209 to validate the digitally signed feature list dongle message hash on the security dongle 219. The security agent 211 executes the digital signature validation code and uses the provider public key 209 to validate the digital signature of the digitally signed feature list dongle message hash. If the digital signature is valid, then, then the security agent 211 enables features of the game image 207 in accordance with the software feature list obtained from the security dongle 219. Embodiments are not limited to authenticating the payload of a security dongle (e.g., the feature list) with a provider public key. For instance, a feature list or feature list hash message can be digitally signed with a payload private key (i.e., a private key generated for the payload). A corresponding payload public key is stored on the security dongle and digitally signed with a provider private key. When the security dongle is associated with a wagering game machine, the wagering game machine authenticates the payload public key as having been signed with the provider private key (using a provider public key available to the wagering game machine). After authenticating the payload public key, a security agent on the wagering game machine then authenticates the payload with the authenticated payload public key. Although this example was presented as serial operations, embodiments can authenticate the payload public key and the payload in parallel, and enable a game, feature list, etc., if both are authenticated.

Embodiments can also store the hash of the software feature list and the security dongle identifier on the security dongle 219. The security agent 211 can use the hash function code of the BIOS 215 to generate a hash of the software feature list on the security dongle 219. The security agent 211 can then authenticate the feature list dongle message hash on the security dongle 219. Thus, the software features are protected by three mechanisms: 1) the security dongle identifier validation, 2) the digital signature validation of the feature list dongle message hash, and 3) the hash validation.

At stage C, the license server 221 tracks enabled game features across multiple wagering game cabinets, including the wagering game cabinet 201. The license server 221 tracks enablement of the game image 207 with the processor identifier indicated by hardware 203, the Ethernet/MAC address indicated by the hardware 202, and the authenticated security dongle identifier. Embodiments do not necessarily track enablement of software with this particular assortment of information. Embodiments can user less information (e.g., security dongle identifier and MAC address), or more information (e.g., a cabinet serial number and a game image serial number in addition to all of the example information).

The example depicted in FIG. 1 and FIG. 2 (and subsequent Figures) do not depict every possible embodiment. Embodiments can implement various aspects differently. For instance, the hash function can be called by an operating system that is not a BIOS, can be implemented with hardware, etc. Further, the stages are intended to aid in understanding embodiments, and should not be used to limit the scope of the claims. Despite the presumed order illustrated in FIG. 1, embodiments can perform the operations of stages B1 and B2 in a different order, in parallel, etc. Likewise, the operations depicted in stages A1 and A2 of FIG. 2 can be performed in any order, in parallel, etc. Furthermore, examples of assets to be protected with the compounded security mechanisms include operating system components, game features, games, etc.

Although FIG. 2 depicts multiple security measures, compounded security with a security dongle does not necessarily involve multiple stages of security measures to enable a feature, patch, update, etc. Embodiments can use a security dongle that is not associated with a game image. For example, the security dongle with a feature list, update, patch, etc., may be issued after the game image has been distributed. In this case, the features can be enabled with a compounded security although not necessarily multiple security measures (e.g., a feature can be enabled based on the authentication of the digitally signed dongle identifier without a correspondence between the dongle identifier and the wagering game cabinet or game image.).

In addition, embodiments can implement the security measures for enabling a piece of software (or hardware) to different degrees. For instance, embodiments can temporarily enable a game image or game feature if one of the multiple security measures or part of a security measure is performed successfully. During that time, embodiments can perform additional operations (e.g., transmit a notification to a provider/developer that a security measure failed, notify a user of a deadline to rectify the failed security measure before erasing the game image, etc.).

Compounding security with a security dongle involves operations prior to a deployment or distribution, and operations in the field. FIGS. 3-6 depict operations that occur before deployment and after deployment.

Figure 3:
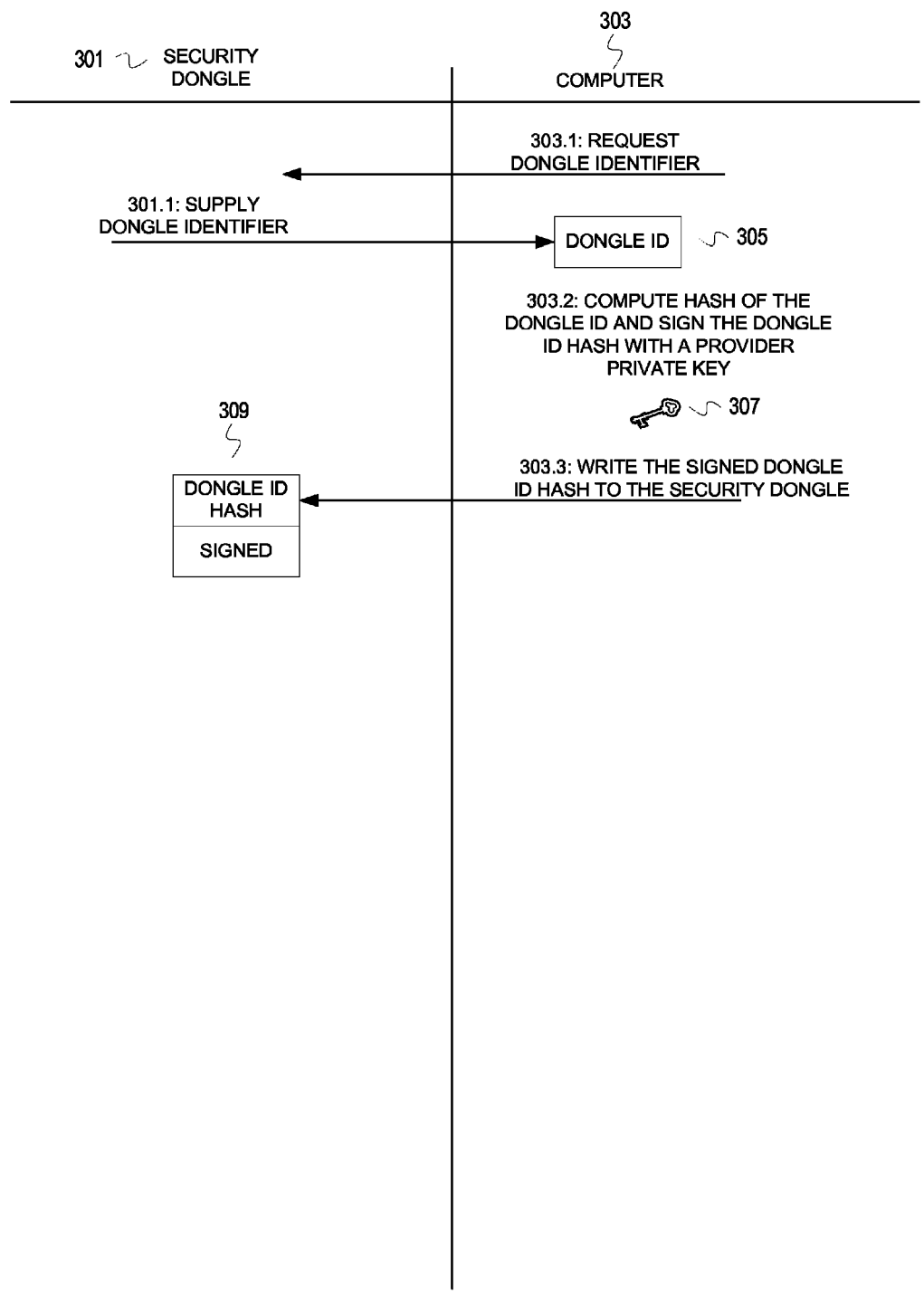
FIG. 3 depicts an example of generating a digitally signed security dongle identifier for an authentication mechanism for compounding with a security dongle prior to deployment.

FIG. 3 depicts an example of generating a digitally signed security dongle identifier for an authentication mechanism for compounding with a security dongle prior to deployment. At 303.1, a computer 303 requests a dongle identifier from a security dongle 301.

At 301.1, the security dongle 301 supplies a dongle identifier 305 that identifies the security dongle 301 to the computer 303.

At 303.2, the computer 303 computes a hash of the dongle identifier 305, and digitally signs the hash of the dongle identifier 305 with a provider private key 307 to generate a digitally signed dongle identifier hash 309. Embodiments can compute a hash of the dongle identifier 305 and additional data associated with a particular game to couple the corresponding security dongle to a particular game, features, and/or components, thus cryptographically binding the security dongle identifier with the additional data. For instance, the computer 303 can compute a hash of the dongle identifier 305 and one or more of a game identifier, a feature list, an operating system component, and an upgrade. The provider private key 307 is an unexposed security element that identifies a developer or provider. The provider private key 307 can also be a dynamically changing private key that is associated with an executive officer of the developer or provider.

At 303.2, the computer 303 writes the digitally signed dongle identifier hash 309 to the security dongle 301.

Figure 4:
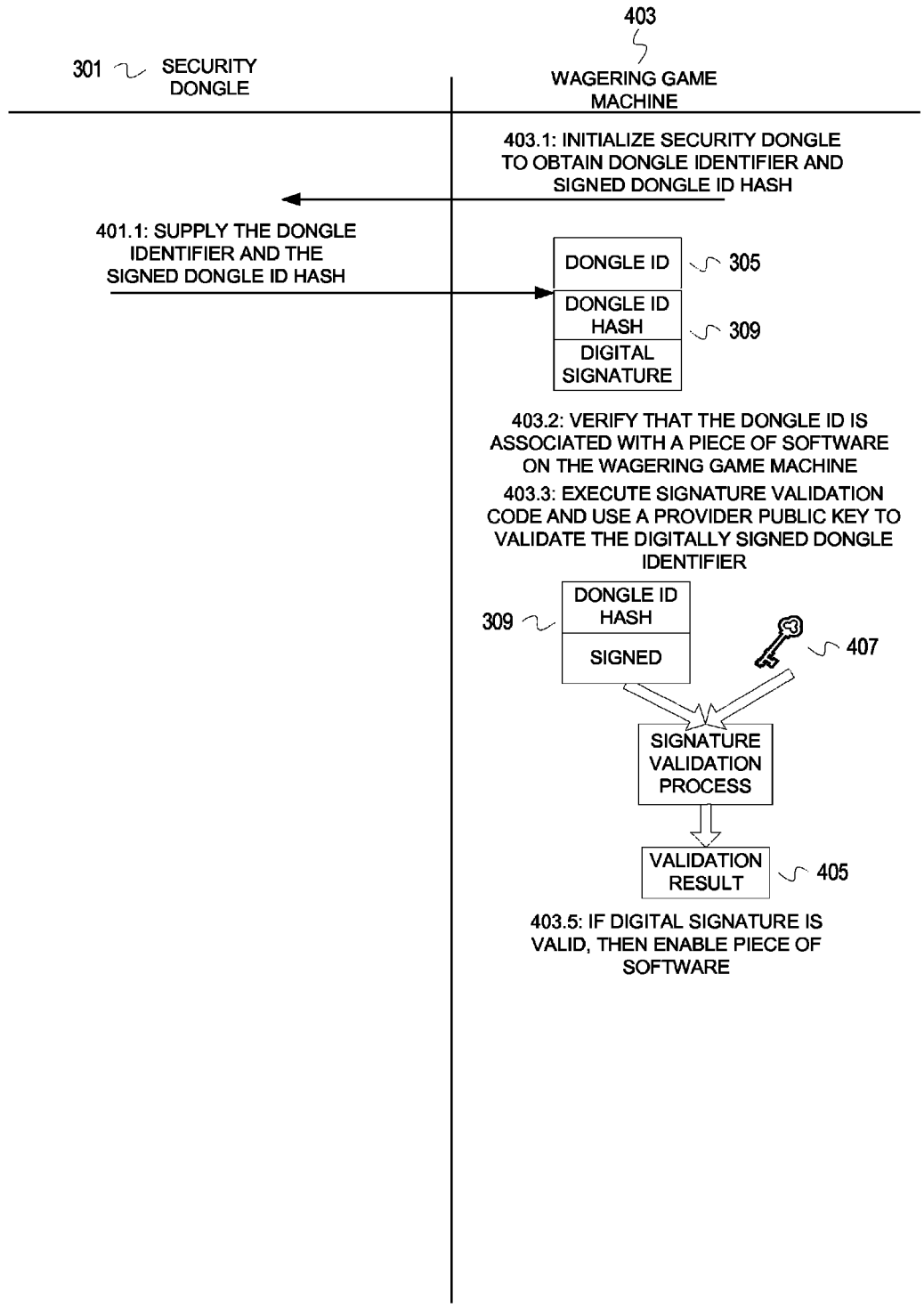
FIG. 4 depicts an example of verifying a security dongle using the example generated digitally signed security dongle identifier to enable a protected piece of software.

FIG. 4 depicts an example of verifying a security dongle using the example generated digitally signed security dongle identifier to enable a protected piece of software. At 403.1, a wagering game machine 403 initializes the security dongle 301, to obtain a dongle identifier and a signed dongle identifier hash from the security dongle 301 previously depicted in FIG. 3. For example, the wagering game machine 403 transmits a request for the dongle identifier to the security dongle 301, and reads the signed dongle identifier hash from a predefined location on the security dongle 301.

At 401.1, the security dongle 301 supplies the dongle identifier 305 and the digitally signed dongle identifier hash 309 to the wagering game machine 403.

At 403.2, the wagering game machine 403 verifies that the dongle identifier 305 is associated with a piece of software (e.g., operating system, wagering game, etc.) on the wagering game machine 403. Embodiments may also verify that the dongle identifier is properly associated with a piece of hardware (e.g., video card).

At 403.3, the wagering game machine 403 executes signature validation code and uses a provider public key 407 to validate the digitally signed dongle id hash 309. The provider public key 407 is a counterpart to the provider private key 307. Execution of the signature validation code invokes a signature validation process that outputs a validation result 405.

At 403.5, the wagering game machine 403 enables the associated piece of software is enabled if the validation result 405 indicates that the digitally signed dongle identifier hash 309 is valid.

Figure 5:
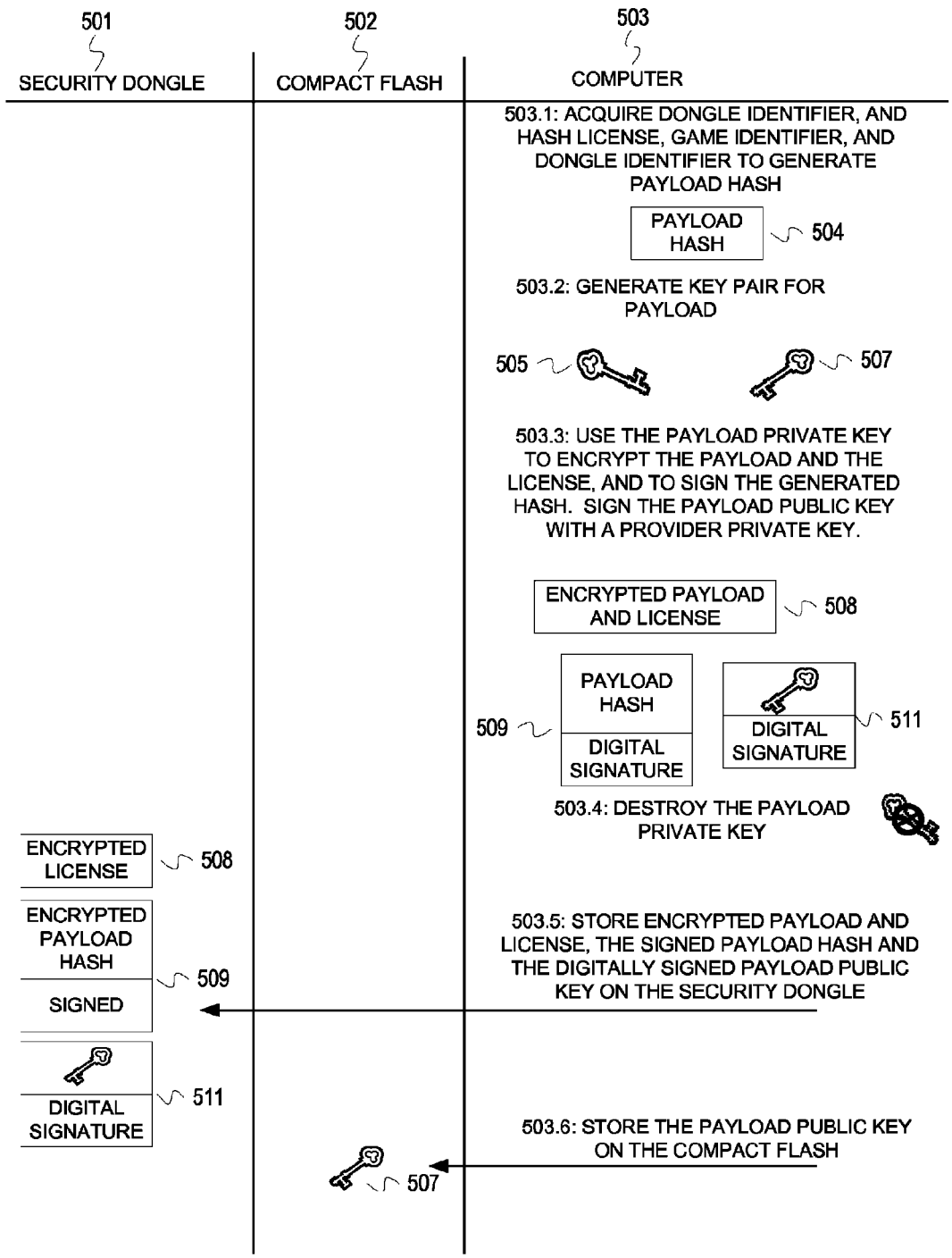
FIG. 5 depicts an example of generating signed payloads and signed public keys for compounding with a security dongle to control enablement of different pieces of software prior to deployment.

FIG. 5 depicts an example of applying compounded security measures to control enablement of game software. At 503.1, a computer 503 computes a hash of a license for a game, a game identifier, and a security dongle identifier a security dongle 501 to generate a payload hash 504.

At 503.2, the computer 503 generates a key pair for the payload hash. 504. The computer generates a payload public key 507 and a payload private key 505.

At 503.3, the computer 503 uses the payload private key 505 to encrypt the license and the payload. The computer 503 also uses the payload private key to digitally sign the payload hash 504 to generate a digitally signed payload hash 509. Embodiments can encrypt the payload hash 504 prior to digitally signing the payload hash. Embodiments can also obviate the encrypting, and convey a digitally signed payload, payload hash, and a payload. The computer 503 signs the payload public key 507 with a provider private key, and generates a certificate 511. The computer 503, however, does not necessarily generate a certificate. The computer 503 can generate a digital signature for the payload public key and store the digital signature onto the security dongle 501 instead of a certificate.

At 503.4, the computer 503 destroys the payload private key 505. Destroying the payload private key 505 prevents misuse of the payload private key 505. The payload private key 505 can be destroyed to control deployment of software. Subsequent updates, patches, add-ons, etc. will be deployed with other payload private keys to prevent previously issued security dongles from being able to enable the subsequent updates, patches, add-ons, etc.

At 503.5, the computer 503 stores the signed payload hash 509, and the certificate 511 on the security dongle 501.

At 503.6, the computer 503 stores the payload public key 507 on a compact flash 502. Embodiments can sign the compact flash 502 with a provider private key after storing the public key 507 on the compact flash.

Figure 6:
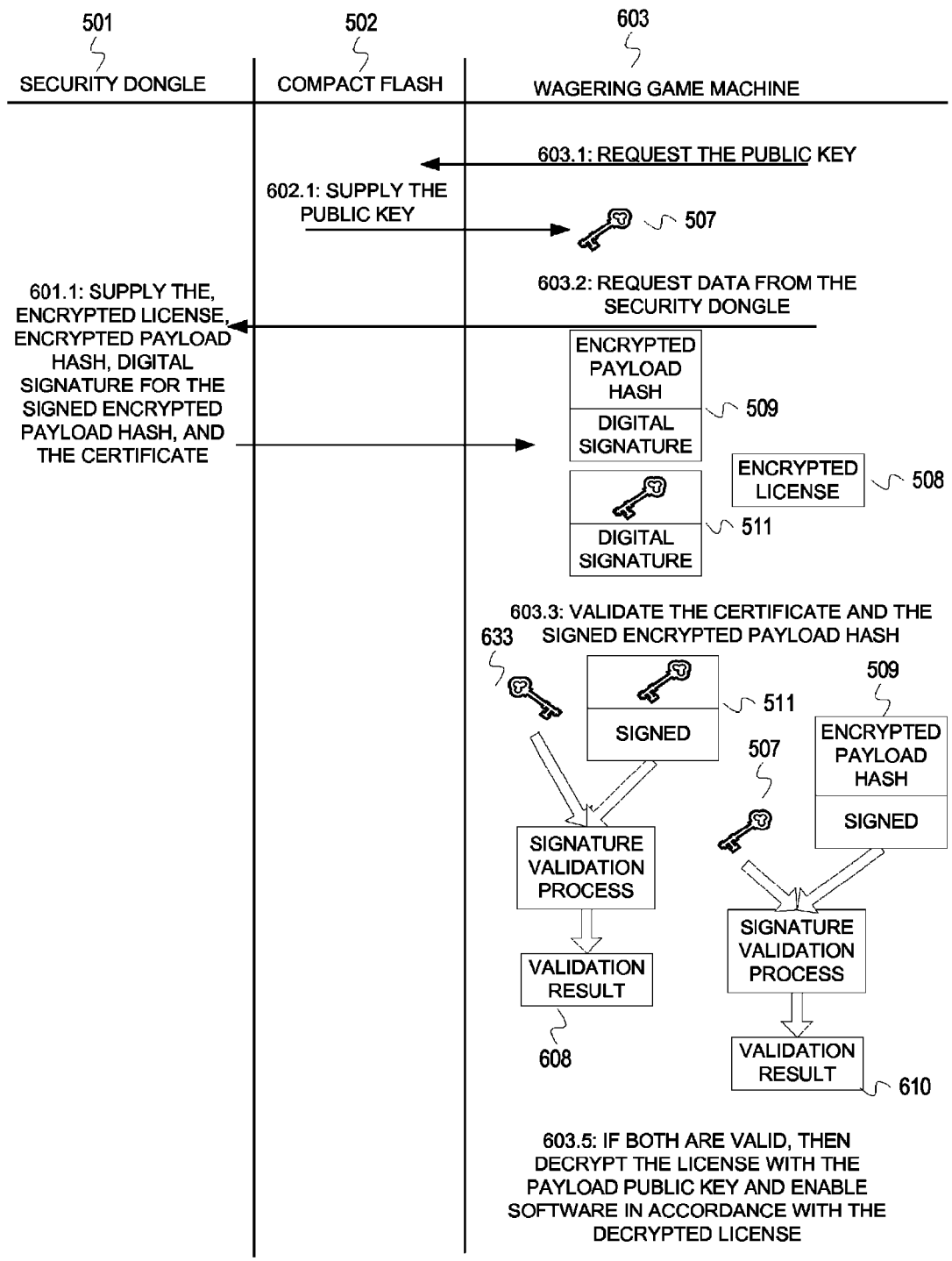
FIG. 6 depicts an example of authenticating the payloads and the public keys in the security dongle to activate/enable the different pieces of software.

FIG. 6 depicts an example of authenticating the payloads and the public keys in the security dongle to activate/enable the software. At 603.1, a wagering game machine 603 requests the payload public key from the compact flash 602 (e.g., the wagering game machine 603 reads a predefined location in the compact flash 502).

At 602.1, the compact flash 502 supplies the payload public key 507 to the wagering game machine 603. If the compact flash was signed, then the wagering game machine 603 validates the signed compact flash 502 with a provider public key available to the wagering game machine 603.

At 603.2, the wagering game machine 603 requests the encrypted license 508, the signed encrypted payload hash 509, and the certificate 511 from the security dongle 501.

At 601.1, the security dongle 501 supplies the encrypted license 508, the signed encrypted payload hash 509, and the certificate 511 to the wagering game machine 603.

At 603.3, the wagering game machine 603 validates the signed encrypted payload hash 509 using the payload public key 507. Also at 603.3, the wagering game machine 603 validates the certificate 511 with a provider public key 633 available to the wagering game machine 603. For example, the wagering game machine 603 invokes a signature validation process. The invoked signature validation process produces a validation result 608 for the certificate 511 and a validation result 610 for the encrypted payload hash 509.

At 603.5, the wagering game machine 603 decrypts the encrypted license 508 with the payload public key 507 and enables software in accordance with the decrypted license if both validation results 608, 610 indicate valid signatures. The wagering game can also condition enablement of software on authenticating the encrypted license. A hash of the encrypted license 508 could have been loaded onto the security dongle 501. The wagering game machine 603 can execute a hash function to generate a hash of the encrypted license 508 to authenticate the encrypted license 508 against the encrypted license hash previously loaded onto the security dongle 501.

Again, it should be understood that FIGS. 3-6 depict examples intended to aid in understanding embodiments, and should not be used to limit embodiments. For instance, FIGS. 5 and 6 refer to a wagering game. Embodiments can use the compounding of security with a security dongle for one or more of a wagering game, operating system, game theme, add-on, software patch, upgrade, feature list, etc. A developer or provider can preserve an initial private key and use it to sign patches, particular operating system components, demo features, etc. Previously issued security dongles can then be used to enable these patches, particular operating system components, demo features, etc. The developer or provider can use different private keys for upgrades, new game themes, etc., and prevent previously issued security dongles from enabling these upgrades, new game themes, etc. Embodiments may embed the public key in the payload instead of storing it on the compact flash. Additional operations can also include one or more cryptographic challenges conducted with the security dongle. Furthermore, although the examples depicted in FIGS. 5 and 6 depict encrypting the license and the payload hash, embodiments can obviate encrypting the license and/or the payload hash.

Variations in embodiments are not limited to different operations. The order of operations depicted in FIGS. 3-6 can vary among embodiments. For instance, embodiments can perform the operations depicted at 503.5 and 503.6 of FIG. 5 in any order, in parallel, etc. In certain embodiments, the operations can be performed by executing instructions residing on machine-readable media (e.g., software), while in other embodiments, the operations can be performed by hardware and/or other logic (e.g., firmware).

Wagering Game Machine Architectures

Figure 7:
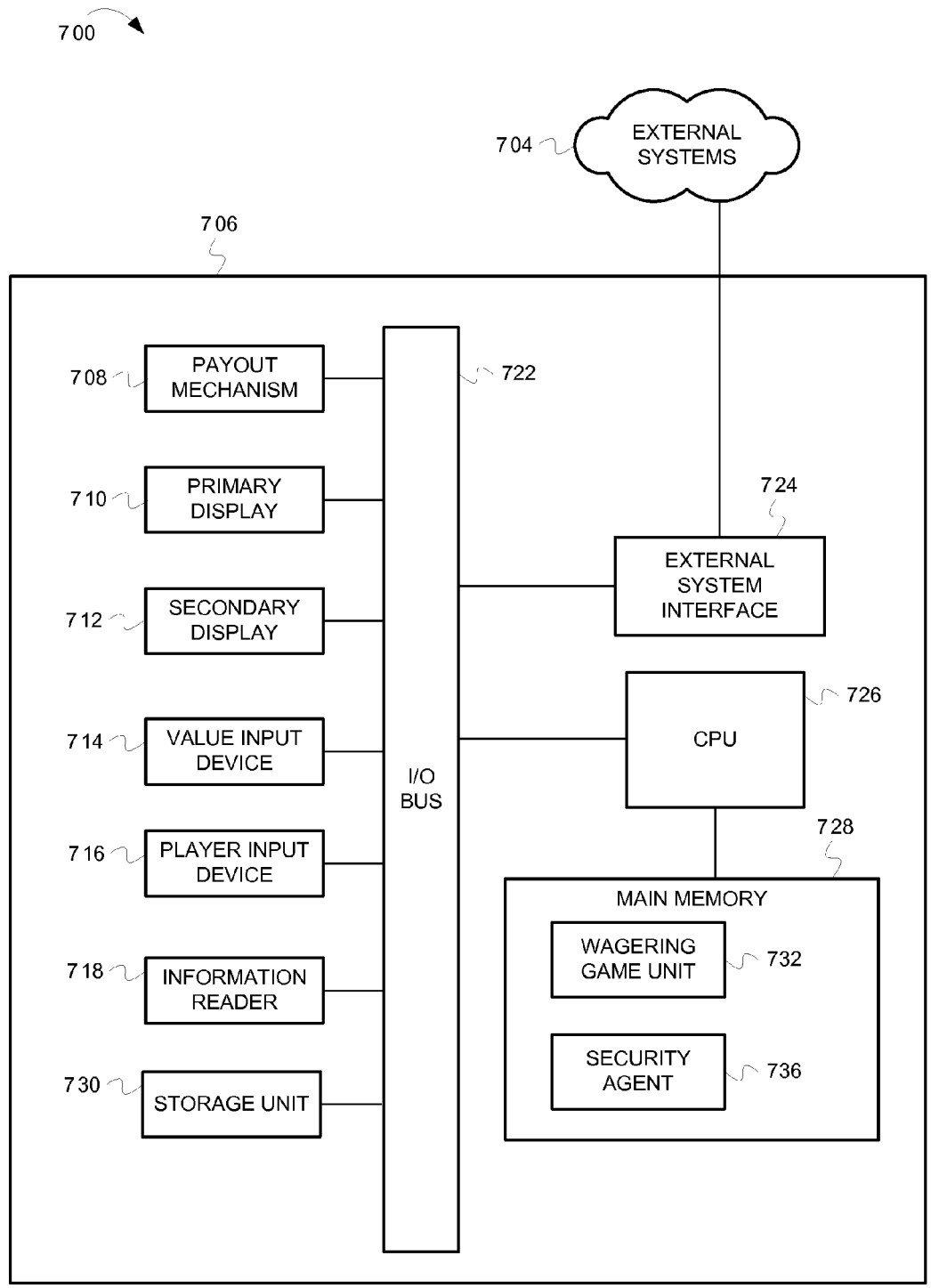
FIG. 7 is a block diagram illustrating a wagering game machine architecture, according to example embodiments of the invention.

FIG. 7 is a block diagram illustrating a wagering game machine architecture, according to example embodiments of the invention. As shown in FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In one embodiment, the wagering game unit 732 can present wagering games, such as video poker, video black jack, video slots, video lottery, etc., in whole or part. The main memory 728 also comprises a security agent 736. The security agent 736 detects use of a security dongle (e.g., communications through a wireless port, physical connectivity via an electrical port, etc.) with the wagering game machine 706 to enable software and/or hardware. The security agent 736 performs operations to obtain data from the security dongle for compounded security (e.g., authentication of data in a secure or non-secure area of the security dongle). The security agent 736 can perform any of the operations described previously.

The CPU 726 is also connected to an input/output (I/O) bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks).

In one embodiment, the wagering game machine 706 can include additional peripheral devices and/or more than one of each component shown in FIG. 7. For example, in one embodiment, the wagering game machine 706 can include multiple external system interfaces 724 and/or multiple CPUs 726. In one embodiment, any of the components can be integrated or subdivided.

Any component of the architecture 700 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable storage media includes read only memory (ROM), random access memory (RAM), magnetic disk storage media, optical storage media, flash memory machines, etc. Machine-readable transmission media includes any media suitable for transmitting software over a network.

While FIG. 7 describes an example wagering game machine architecture, this section continues with a discussion wagering game networks.

Wagering Game Networks

Figure 8:
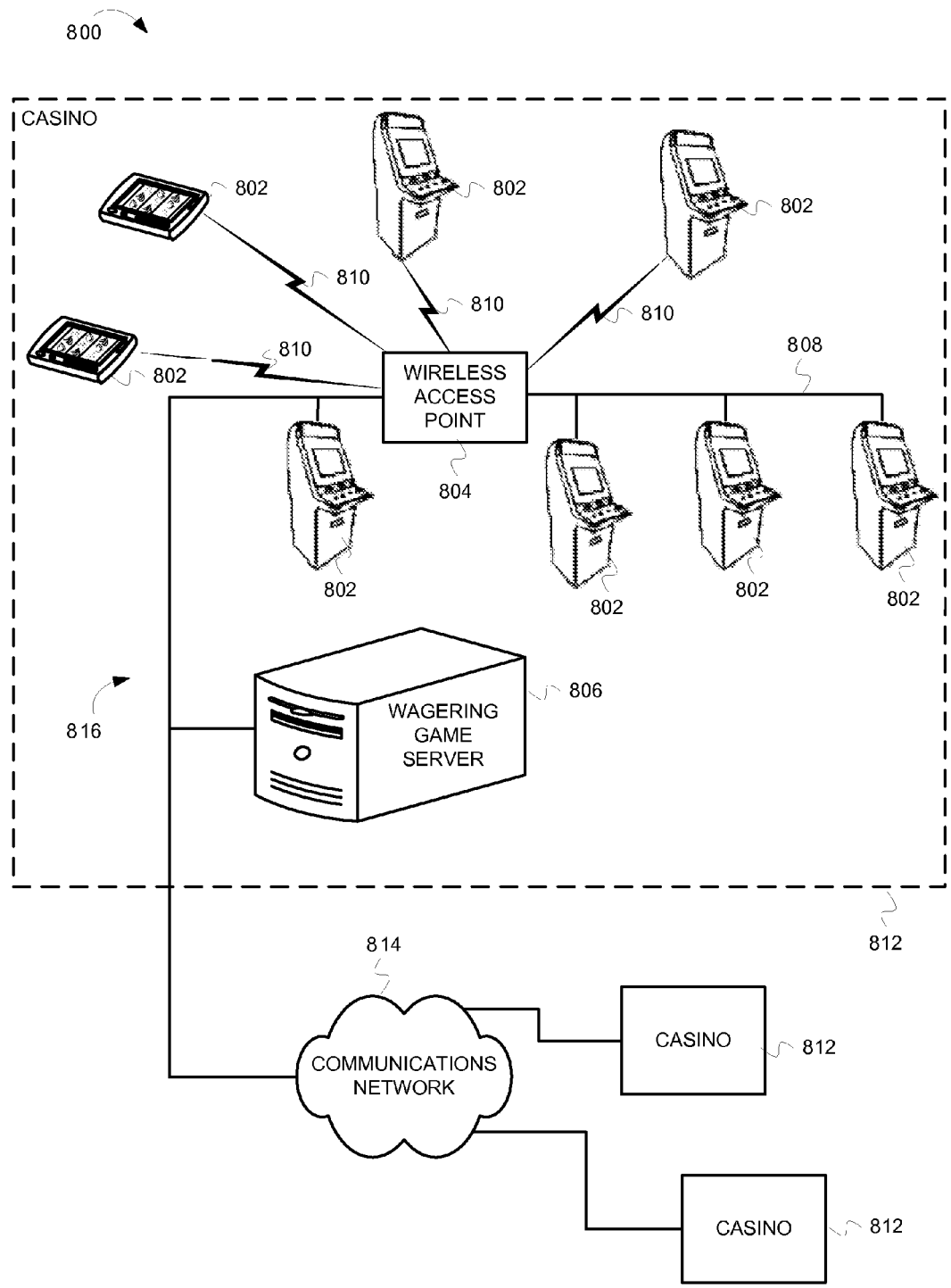
FIG. 8 is a block diagram illustrating a wagering game network 800, according to example embodiments of the invention.

FIG. 8 is a block diagram illustrating a wagering game network 800, according to example embodiments of the invention. As shown in FIG. 8, the wagering game network 800 includes a plurality of casinos 812 connected to a communications network 814.

Each casino 812 includes a local area network 816, which includes an access point 804, a wagering game server 806, and wagering game machines 802. The access point 8304 provides wireless communication links 810 and wired communication links 808. The wired and wireless communication links can employ any suitable connection technology, such as Bluetooth, 802.11, Ethernet, public switched telephone networks, SONET, etc. In some embodiments, the wagering game server 806 can serve wagering games and distribute content to devices located in other casinos 812 or at other locations on the communications network 814. The wagering game server 806 can also operate as a license server. Embodiments can also implement the wagering game server 806 to perform operations for compounding security with a security dongle for software/hardware enablement (e.g., providing public keys).

The wagering game machines 802 described herein can take any suitable form, such as floor standing models, hand-held mobile units, bartop models, workstation-type console models, etc. Further, the wagering game machines 802 can be primarily dedicated for use in conducting wagering games, or can include non-dedicated devices, such as mobile phones, personal digital assistants, personal computers, etc. In one embodiment, the wagering game network 800 can include other network devices, such as accounting servers, wide area progressive servers, player tracking servers, and/or other devices suitable for use in connection with embodiments of the invention.

In some embodiments, wagering game machines 802 and wagering game servers 806 work together such that a wagering game machine 802 can be operated as a thin, thick, or intermediate client. For example, one or more elements of game play may be controlled by the wagering game machine 802 (client) or the wagering game server 806 (server). Game play elements can include executable game code, lookup tables, configuration files, game outcome, audio or visual representations of the game, game assets or the like. In a thin-client example, the wagering game server 806 can perform functions such as determining game outcome or managing assets, while the wagering game machine 802 can present a graphical representation of such outcome or asset modification to the user (e.g., player). In a thick-client example, the wagering game machines 802 can determine game outcomes and communicate the outcomes to the wagering game server 806 for recording or managing a player's account.

In some embodiments, either the wagering game machines 802 (client) or the wagering game server 806 can provide functionality that is not directly related to game play. For example, account transactions and account rules may be managed centrally (e.g., by the wagering game server 806) or locally (e.g., by the wagering game machine 802). Other functionality not directly related to game play may include power management, presentation of advertising, software or firmware updates, system quality or security checks, etc.

Any of the wagering game network components (e.g., the wagering game machines 802) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
   performing a first security measure with a security dongle for enabling a piece of software on a wagering game machine wherein said performing the first security measure with the security dongle comprises,
      obtaining a first security dongle identifier from the security dongle;
      determining that the first security dongle identifier obtained from the security dongle matches a second security dongle identifier associated with an identifier of the piece of software on the wagering game machine;
   obtaining a digitally signed payload from the security dongle, wherein the payload corresponds to the piece of software;
   performing a second security measure with the digitally signed payload, wherein said performing the second security measure with the digitally signed payload comprises authenticating the security dongle with respect to the piece of software; and
   enabling the piece of software based, at least in part, on said performing the first and the second security measures.

2. The method of claim 1, wherein the piece of software comprises at least one of a wagering game, wagering game theme instantiation code, an operating system, an application add-on, a software upgrade, executable code for enabling one or more features to be enabled and/or disabled as indicated by a feature list, and a component of an operating system.

3. The method of claim 1, wherein said authenticating the security dongle with respect to the piece of software comprises:
   authenticating the digitally signed payload, wherein the digitally signed payload comprises a digitally signed hash of at least an identifier of the security dongle and an identifier of the piece of software.

4. The method of claim 3, wherein the digitally signed hash further comprises one or more of a feature list, a license, an operating system component, and a game theme hashed with the security dongle identifier and the identifier of the piece of software.

5. The method of claim 4 further comprising authenticating a payload public key with a digital signature of the payload public key and with a provider public key that is available to the wagering game machine, wherein the wagering game machine obtains the digital signature of the payload public key from the security dongle and the provider public key corresponds to a secured provider private key that corresponds to a provider of the piece of software.

6. One or more non-transitory machine-readable storage media having stored therein instructions executable by a processor, wherein executing the instructions causes the processor to perform operations that comprise:
   performing a first security measure with a security dongle for enabling a piece of software on a wagering game machine, wherein said operation of performing the first security measure with the security dongle comprises,
      obtaining a first security dongle identifier from the security dongle;
      determining that the first security dongle identifier obtained from the security dongle matches a second security dongle identifier associated with an identifier of the piece of software on the wagering game machine;

obtaining a digitally signed payload from the security dongle, wherein the payload corresponds to the piece of software;

performing a second security measure with the digitally signed payload, wherein said operation of performing the second security measure with the digitally signed payload comprises authenticating the security dongle with respect to the piece of software; and enabling the piece of software based, at least in part, on said performing the first and the second security measures.

7. The machine-readable media of claim 6, wherein the piece of software comprises at least one of a wagering game, wagering game theme instantiation code, an operating system, an application add-on, a software upgrade, executable code for enabling one or more features to be enabled and/or disabled as indicated by a feature list, and a component of an operating system.

8. An apparatus comprising:

a processor;

a port coupled with the processor, the port operable to transmit data to and from a security dongle; and a security agent operable to, retrieve from the security dongle a digital signature generated for a payload;

verify that the payload comprises a hash of at least an identifier of a piece of software to be authorized with the security dongle and a first security don identifier of the security dongle;

perform a first security measure with the security dongle for enabling the piece of software on the apparatus, wherein the security agent being operable to perform the first security measure comprises the security agent operable to obtain the first security dongle identifier from the security dongle and operable to determine that the first security dongle identifier obtained from the security dongle matches a second security dongle identifier associated with the identifier of the piece of software on the apparatus; and perform a second security measure, wherein the security agent being operable to perform the second security measure comprises the security agent being operable to use the digital signature to authenticate the security dongle with respect to the piece of software.

9. The apparatus of claim 8, wherein the hash is also of a feature list that corresponds to the piece of software, wherein the piece of software corresponds to a wagering game.

10. The apparatus of claim 8 further comprising memory that hosts a BIOS and code for implementing a hash function that corresponds to the hash.

11. The apparatus of claim 10, wherein the memory also hosts a public key accessible by the security agent to authenticate the security dongle.

* * * * *